US010831190B2

(12) United States Patent
Amirloo Abolfathi

(10) Patent No.: US 10,831,190 B2
(45) Date of Patent: Nov. 10, 2020

(54) SYSTEM, METHOD, AND PROCESSOR-READABLE MEDIUM FOR AUTONOMOUS VEHICLE RELIABILITY ASSESSMENT

(71) Applicant: Elmira Amirloo Abolfathi, North York (CA)

(72) Inventor: Elmira Amirloo Abolfathi, North York (CA)

(73) Assignee: Huawei Technologies Co., Ltd., Shenzhen (CN)

(*) Notice: Subject to any disclaimer, the term of this patent is extended or adjusted under 35 U.S.C. 154(b) by 174 days.

(21) Appl. No.: 15/683,192

(22) Filed: Aug. 22, 2017

(65) Prior Publication Data

US 2019/0064799 A1    Feb. 28, 2019

(51) Int. Cl.

| | | |
|---|---|---|
| *G01C 22/00* | (2006.01) | |
| *G07C 5/00* | (2006.01) | |
| *G07C 5/08* | (2006.01) | |
| *G05D 1/00* | (2006.01) | |
| *B60W 30/182* | (2020.01) | |
| *B60W 50/02* | (2012.01) | |
| *B60W 50/00* | (2006.01) | |

(52) U.S. Cl.
CPC ......... *G05D 1/0061* (2013.01); *B60W 30/182* (2013.01); *B60W 50/0205* (2013.01); *G05D 1/0055* (2013.01); *G07C 5/0808* (2013.01); *B60W 2050/0022* (2013.01); *B60W 2050/0215* (2013.01); *B60W 2420/42* (2013.01); *B60W 2420/52* (2013.01); *B60W 2420/54* (2013.01); *B60W 2555/20* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 2014/0340525 A1* | 11/2014 | Johannesson | H04N 17/002 348/175 |
| 2015/0103159 A1* | 4/2015 | Shashua | G06K 9/00798 348/118 |
| 2015/0178998 A1* | 6/2015 | Attard | G07C 5/008 701/23 |
| 2017/0124476 A1 | 5/2017 | Levinson et al. | |

FOREIGN PATENT DOCUMENTS

| | | |
|---|---|---|
| CN | 103250195 A | 8/2013 |
| CN | 104859662 A | 8/2015 |
| CN | 106347359 A | 1/2017 |
| CN | 106815471 A | 6/2017 |
| CN | 1070010063 A | 8/2017 |
| JP | 2007248271 A | 9/2007 |
| JP | 2014071003 A | 4/2014 |
| JP | 2015036840 A | 2/2015 |
| JP | 2015230552 A | 12/2015 |

* cited by examiner

*Primary Examiner* — Adam D Tissot

(57) ABSTRACT

A system, method, and processor-readable medium for assessing the reliability of vehicle systems used in an autonomous vehicle. The assessment may be performed at least in part on the basis of data collected by one or more of the vehicle's sensors. The result of the assessment may be used as the basis for decisions about vehicle operation carried out by an autonomous driving module.

29 Claims, 4 Drawing Sheets

SYSTEM, METHOD, AND PROCESSOR-READABLE MEDIUM FOR AUTONOMOUS VEHICLE RELIABILITY ASSESSMENT

FIELD

At least some example embodiments relate to autonomous vehicles, and in particular to assessing the reliability of vehicle systems with respect to autonomous vehicle functions.

BACKGROUND

Autonomous vehicle systems are generally classified into one of six levels of autonomy: from Level 0 (warnings only, no vehicle control) to Level 1 ("hands on"), to Level 2 ("hands off"), to Level 3 ("eyes off"), to Level 4 ("mind off"), to Level 5 ("wheel optional"). At any level of autonomy, however, an autonomous vehicle system relies on sensors to scan its environment and provide environmental data used in operating the vehicle and/or informing the driver.

Different conditions, such as the quality of sensory data and weather conditions, can significantly affect the reliability of an autonomous driving solution. In general, reliable operation of a fully autonomous ("Level 5") driving system requires all vehicle systems, including all sensor systems, to be able to work reliably under all different conditions.

To achieve this level of reliability, most fully autonomous driving systems use expensive sensors such as LIDAR (Light Detection and Ranging). Although these sensors can make the solution more robust, they are expensive.

Furthermore, even LIDAR systems have some limitations. For example, they are vulnerable to weather conditions. In addition, the wavelengths used in LIDAR systems are often not long enough to penetrate environmental contaminants such as dust and are attenuated by adverse weather conditions such as snow and fog. LIDAR system performance may also be degraded if there is dirt, mud or some other physical contaminant on the LIDAR sensor. Accordingly, systems based on LIDAR may exhibit poor performance in adverse weather conditions and LIDAR is therefore not a reliable sensor in all conditions.

Other sensor types, such as cameras used to provide vision-based scanning, radar or ultrasound systems used to scan an environment, GPS (global positioning system) for global positioning, and other sensor types all have their own limitations. Any sensor can fail or produce unreliable data due to environmental conditions or due to internal defects.

Similarly, non-sensor vehicle systems may be limited in their reliability by environmental or internal conditions. Brakes or steering systems may be less effective when they have not been serviced recently, or in certain weather or road conditions.

Current autonomous vehicle design strategies require that all vehicle systems, including sensors, meet a high threshold for reliability in all conditions. Aside from the high expense of equipping a vehicle with expensive, robust systems, this carries a high maintenance cost and may result in significant vehicle down-time in the event of any internal error in any vehicle system.

Additional difficulties with existing systems may be appreciated in view of the Detailed Description of Example Embodiments, below.

SUMMARY

The present disclosure describes example systems, methods and processor-readable media for assessing the reliability of vehicle systems used in an autonomous vehicle. The assessment may be performed at least in part on the basis of data collected by one or more of the vehicle's sensors. The result of the assessment may be used as the basis for decisions about vehicle operation carried out by an autonomous driving module.

Example embodiments are directed to a system, method and processor-readable medium for assessing reliability for an autonomous vehicle. The system comprises a memory and a processor. The processor is in communication with the memory and configured to execute computer instructions stored on the memory. The computer instructions cause the processor to receive condition data relating to at least one vehicle system condition or environmental condition, generate vehicle system reliability data relating to at least one vehicle system, and send the vehicle system reliability data to an autonomous driving module.

According to a further aspect which can be combined with other embodiments disclosed herein, the system further comprises at least one condition sensor for collecting the condition data, wherein the processor is further configured to execute computer instructions causing the processor to receive the condition data from the at least one condition sensor.

According to a further aspect which can be combined with other embodiments disclosed herein, the at least one condition sensor comprises at least one vehicle system diagnostic sensor and the condition data comprises vehicle system condition data.

According to a further aspect which can be combined with other embodiments disclosed herein, the at least one condition sensor comprises at least one environmental sensor and the condition data comprises environmental condition data.

According to a further aspect which can be combined with other embodiments disclosed herein, the at least one assessed vehicle system comprises the at least one condition sensor.

According to a further aspect which can be combined with other embodiments disclosed herein, the at least one condition sensor comprises a camera.

According to a further aspect which can be combined with other embodiments disclosed herein, the condition data comprises image sharpness data.

According to a further aspect which can be combined with other embodiments disclosed herein, the condition data comprises weather-related environmental condition data.

According to a further aspect which can be combined with other embodiments disclosed herein, the system further comprises the autonomous driving module, wherein the autonomous driving module comprises a software module implemented by the processor by executing instructions to select an autonomous driving mode based on the vehicle system reliability data.

According to a further aspect which can be combined with other embodiments disclosed herein, the autonomous driving mode comprises a level of autonomous operation.

According to a further aspect which can be combined with other embodiments disclosed herein, the at least one assessed vehicle system comprises a sensor system, and the autonomous driving mode comprises a weight to apply to sensor data collected by the sensor system.

According to a further aspect which can be combined with other embodiments disclosed herein, the autonomous driving mode comprises activation or deactivation of one or more auxiliary vehicle systems.

According to a further aspect which can be combined with other embodiments disclosed herein, the vehicle system reliability data is based on the condition data.

According to a further aspect which can be combined with other embodiments disclosed herein, there is provided a method for assessing vehicle system reliability for an autonomous vehicle, comprising the steps of receiving condition data relating to at least one vehicle system condition or environmental condition, assessing the reliability of at least one assessed vehicle system based on the received condition data, generating vehicle system reliability data based on the assessment of the reliability of the at least one assessed vehicle system, and sending the vehicle system reliability data to an autonomous driving module.

According to a further aspect which can be combined with other embodiments disclosed herein, there is provided a non-transitory processor-readable medium containing instructions executable by a processor to carry out the methods or system processor steps above.

BRIEF DESCRIPTION OF THE DRAWINGS

Embodiments will now be described by way of examples with reference to the accompanying drawings, in which like reference numerals may be used to indicate similar features, and in which.

DETAILED DESCRIPTION OF EXAMPLE EMBODIMENTS

While conventional solutions for autonomous vehicle operation require a robust set of sensors and other vehicle systems that operate at full reliability in all conditions, such requirements impose high costs in terms of extensive equipment, maintenance, and downtime. However, such universal robustness under all conditions may not be an absolute requirement for a functional autonomous vehicle solution. It is notable that human operators are capable of safely and reliably operating vehicles without a full suite of LIDAR and other sensors, but with resort only to their limited vision systems which do not operate perfectly under all conditions. Thus, it should be possible to deploy an autonomous vehicle solution that relies on a more modest set of sensors and other equipment and that uses information about the limits on its own capabilities to make decisions about how to operate the vehicle.

A common argument against the use of autonomous driving solutions that rely on cheaper sensors such as cameras is the vulnerability of such sensors to different lighting and weather conditions. A possible solution to this problem is to allow a system to alter its autonomous driving mode in response to adverse conditions that could affect the reliability of its sensor output.

Example embodiments are directed to a system, method and processor-readable medium for assessing the reliability of autonomous vehicle systems, including sensor systems, and selecting an autonomous driving mode based on this reliability data.

Figure 1:
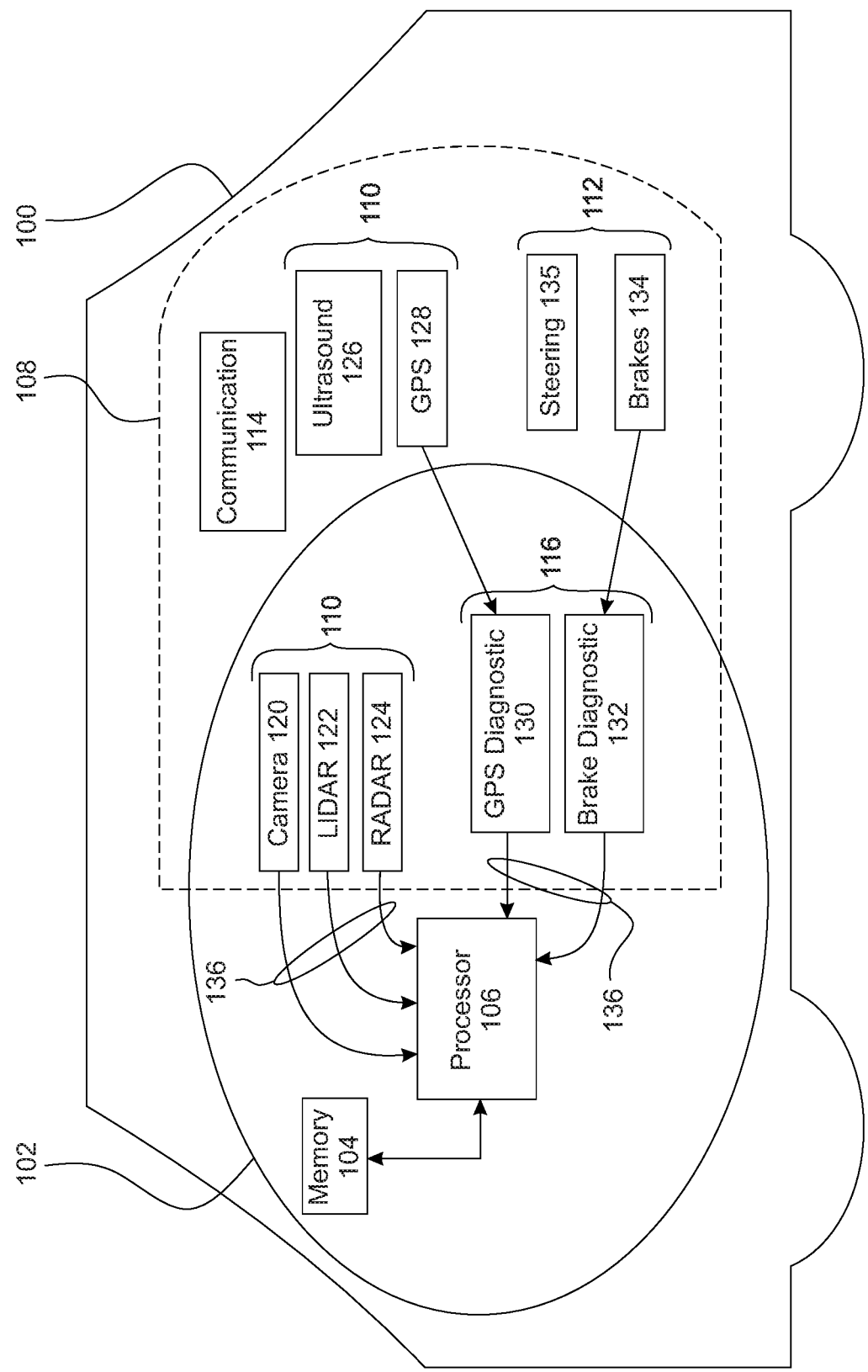
FIG. 1 is a block diagram of an autonomous vehicle showing an example reliability assessment system in communication with vehicle systems.

In one example embodiment, shown in FIG. 1, an autonomous vehicle 100 (in this example, an autonomous ground-based vehicle such as a car) is equipped with a reliability assessment system 102. The reliability assessment system 102 has a memory 104 and a processor 106 and in some embodiments may be an on-board microcomputer. The memory 104 stores computer instructions, and the processor 106 in communications with the memory 104 executes these instructions to carry out the methods described herein.

The vehicle 100 has a number of vehicle systems 108, which in some embodiments may include both sensor systems 110 (e.g. camera system 120, LIDAR system 122, radar system 124, ultrasound system 126, GPS 128, external temperature sensor, precipitation sensor, speedometer, inertial measurement unit, odometer, microphone) as well as non-sensor systems 112 (e.g. steering system 135, braking system 134, transmission, electrical system, climate control, dashboard system). In some embodiments, the vehicle 100 may have one or more communications systems 114, which may operate as sensor systems 110 or non-sensor systems 112 in the context of the described methods depending on how they are used.

The vehicle 100 may also in some embodiments have one or more vehicle system diagnostic sensors 116 configured to diagnose the status of one or more of the vehicle systems 108. Examples of vehicle system diagnostic sensors 116 are sensors that detect specific failure states of one or more vehicle systems, such as low battery power or mechanical failure of a vehicle system having moving parts. For example, a camera used by the vehicle 100 for navigation may be mounted on a mechanical component allowing the camera to rotate: an example of a vehicle system diagnostic sensor 116 in this case would be a mechanical sensor to detect whether the camera mount was rotating properly. In the example in FIG. 1, two vehicle system diagnostic sensors 116 are shown: a GPS diagnostic sensor 130 and a brake diagnostic sensor 132 used to collect data on the status of the GPS 128 and braking system 134, respectively.

In example embodiments, the processor 106 executes instructions to carry out a method for assessing the reliability of one or more vehicle systems 108, as further described below. The reliability of the vehicle systems 108 is assessed based on condition data 136 received by the processor 106, where the condition data 136 may include vehicle system condition data 140 regarding the status of a vehicle system 108, and/or environmental condition data 150 regarding the status of the environment around the vehicle 100.

In general, the term "environment" is used herein to refer to conditions external to the vehicle itself. Environmental conditions can include, but are not limited to: weather conditions, lighting conditions, signal distortion conditions (e.g. situations when radio, GPS and other signals sent to or from the vehicle 100 are reflected or blocked by objects in the environment), glare, light reflections, visual field blockage, vehicle speed, road conditions (e.g. ice, wetness, flooding, damaged road surface, type of road surface), geographic conditions (e.g. whether the vehicle is currently in an industrial, commercial, residential, highway, or rural road area), and detection of other objects in the area (e.g. debris on the road, tree canopy cover or tunnel roofs that could block GPS signals, other vehicles that could block sensors or could pose collision hazards).

The condition data 136 may in example embodiments be received from some combination of the vehicle's sensor systems 110, the vehicle system diagnostic sensors 116, and/or external sources of information via the vehicle's communication system 114. When sensor systems 110 or vehicle system diagnostic sensors 116 are used to collect condition data 136, those sensors may be referred to as condition sensors.

In some embodiments, both the sensor systems 110 and the vehicle system diagnostic sensors 116 are capable of collecting vehicle system condition data 140 to assist in evaluating the reliability of the vehicle systems 108. The vehicle condition data 140 may include data about the internal state or operating status of a vehicle system which indicates the reliability or quality of that vehicle system 108. For example, vehicle system condition data 140 relating to the condition of a camera system 120 may be collected from some combination of vehicle system diagnostic sensors 116 (e.g. a mechanical sensor detecting the status of the mechanical operation of the camera, an electrical sensor detecting the voltage supplied to the camera) and sensor systems 110, the latter of which may include the camera system 120 itself: for example, image data from the camera system 120 may in some embodiments be used as all or part of the vehicle system condition data 140 relating to the condition of the camera system 120.

Figure 2:
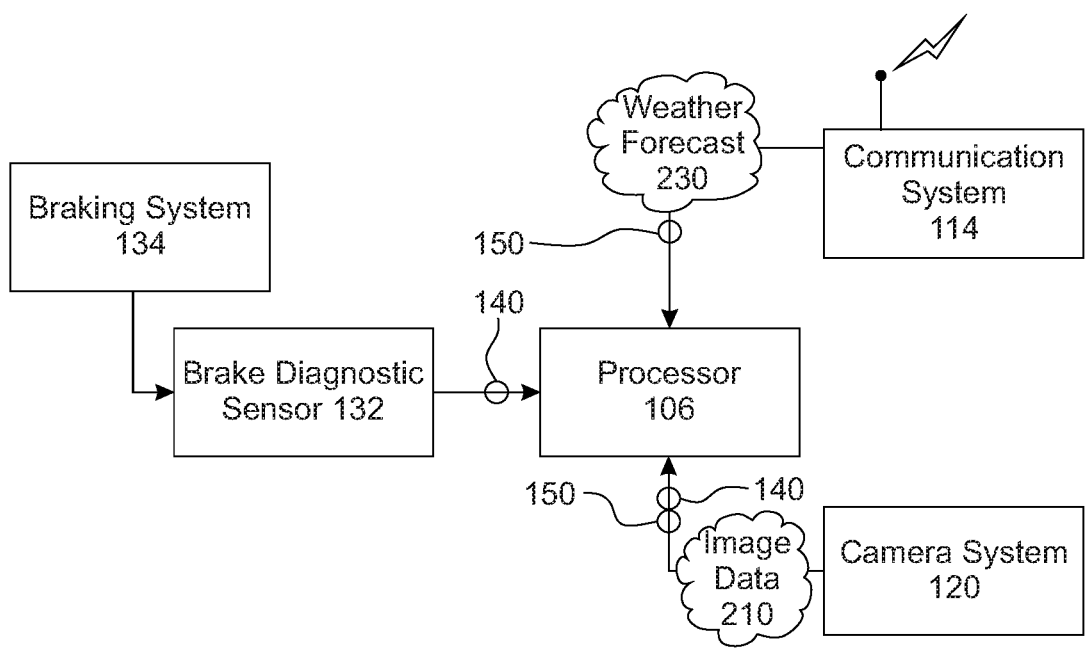
FIG. 2 is a block diagram showing a processor receiving condition data from vehicle systems as part of an example reliability assessment system.

Thus, in an example embodiment shown in FIG. 2, the condition data 136 received by the processor 106 may include image data 210 from the vehicle's 100 navigational camera system 120, brake-pad status information 212 received from a brake diagnostic sensor 132 configured to collect data on the braking system 134, and weather forecasting information 230 received from the communication system 114, which in this example may be a wireless communication system connected to the Internet or another digital communication network. In this example, the condition data 136 received from the brake diagnostic sensor 132 is vehicle system condition data 140 relating to the status of the braking system 134; the condition data 136 received from the communication system 114 is environmental condition data 150 relating to the weather conditions in the environment; and the condition data 136 received from the camera system 120 may include both vehicle system condition data 140 relating to the status of the camera system 120 itself as well as environment condition data 150 relating to, e.g., external lighting conditions and/or visual detection of objects in the environment.

The processor 106 uses the received condition data 136 to assess the reliability of one or more assessed vehicle systems. In some examples, the assessed vehicle system may be one of the sensor systems 110 collecting condition data 136 used in this assessment. For example, image data 210 from the camera system 120 may be used to assess the reliability of the camera system 120. The image data 210 may include environmental condition data 150 such as glare causing sensor saturation, night-time or other low-light conditions, or weather-related condition data (e.g. visual detection of precipitation in the environment), each of which may affect the reliability of the camera system 120. The image data 210 may also include vehicle system condition data 140 relating to the camera system 120, such as occlusion of the lens by mud or ice, inability to focus due to freezing, damage to the lens or other camera components, or total loss of image due to camera inoperability. Image sharpness data may be used in some embodiments to assess the reliability of the camera system 120. In some embodiments, saturation of the sensor of a camera system 120 may be detected by the presence of specific types of geometric and/or colour patterns in the image data from the camera system 120: for example, a camera collecting light information for multiple colour channels may be able to detect saturation of one or more colour channels by analyzing the data collected on those channels, either on their own or in combination with information from the other colour channels.

In some examples, reliability assessment could involve the application of existing assessment standards or metrics to the assessed vehicle system. For example, a GPS/GNSS (Global Navigation Satellite System) sensor system 122 may have its reliability assessed with reference to existing metrics such as Dilution of Precision (DOP), which determines the effect of the geometry of satellites on the precision of the GPS measurements.

In some examples, a sensor system 110 such as a camera system 120 may perform a self-test 402 in order to generate specific condition data 136 useful in assessing the reliability of the sensor system 110 (i.e. the assessed system). For example, a camera system 120 may perform a self-test 402 by analyzing its image data for information indicating image sharpness. The processor 106 could use this image sharpness data as condition data 136 to assess the reliability of the camera system 120 under current conditions.

In some examples, the assessed system may be a different sensor system 110 than the sensor system 110 collecting the condition data 136 used in that assessment, or may be a non-sensor system 112. For example, condition data 136 collected from a camera system 120 could be used to assess the reliability of a LIDAR system 122 or a braking system 134 by using image data 210 from the camera system 120 to detect falling rain, which can affect the performance of both the LIDAR system 122 and braking system 134. In this example, the assessed systems are the LIDAR system 122 and the braking system 134, while the source of the condition data 136 is the camera system 120.

When the reliability assessment system 102 assesses the reliability of an assessed vehicle system, it may combine data from multiple sources. For example, condition data 136 from two or more vehicle systems 108 may be combined together and/or combined with other data to determine the reliability of a given vehicle system 108, as in the example shown in FIG. 2 and described above. The assessed reliability of an assessed vehicle system is a measure of the confidence in the operation or output of that vehicle system 108, or the confidence in a sensor system's capability for detecting errors. In some examples, environmental condition data 150 may be used to assess the reliability of one or more sensor systems 110 or non-sensor systems 112, as in the example in FIG. 2 and described above wherein weather forecasting data 230 received from the communication system 114 is combined with image data 210 from the camera system 120 to assess the reliability of the camera system 120: environmental condition data 150 indicating night-time low-light conditions or rain, for example, could both negatively affect the assessment of the reliability of the camera system 120. In the same example, the image data 210 and weather forecasting data 230 is further combined with the vehicle system condition data 140 indicating brake status to assess the reliability of the braking system 134: as one example, a combination of rain (environment condition) and faulty anti-lock braking functionality (vehicle system condition) might trigger a negative assessment of the reliability of the braking system 134 where one or the other condition on its own would not.

The vehicle system reliability data 320 may take different forms. It may be represented differently for different assessed systems, and it may be multi-dimensional rather than a scalar value indicating a degree of confidence or reliability. It may be structured in a way that allows an autonomous driving solution to act upon the data 320 in very specific ways: for example, reliability data 320 about an assessed camera system 120 might distinguish between complete failure of the camera system 120 and low confidence in the camera system 120 to detect objects outside of a certain angle of vision or past a certain distance due to environmental conditions.

Vehicle system reliability data 320 may represent confidence in the output of a sensor system 100 in some examples. The content of this data 320 may include any suitable data regarding confidence or reliability, such as: sharpness of image data, resolution of GPS data (e.g. accurate to within N metres), image saturation data, or simply a binary pass/fail assessment of reliability.

Figure 3:
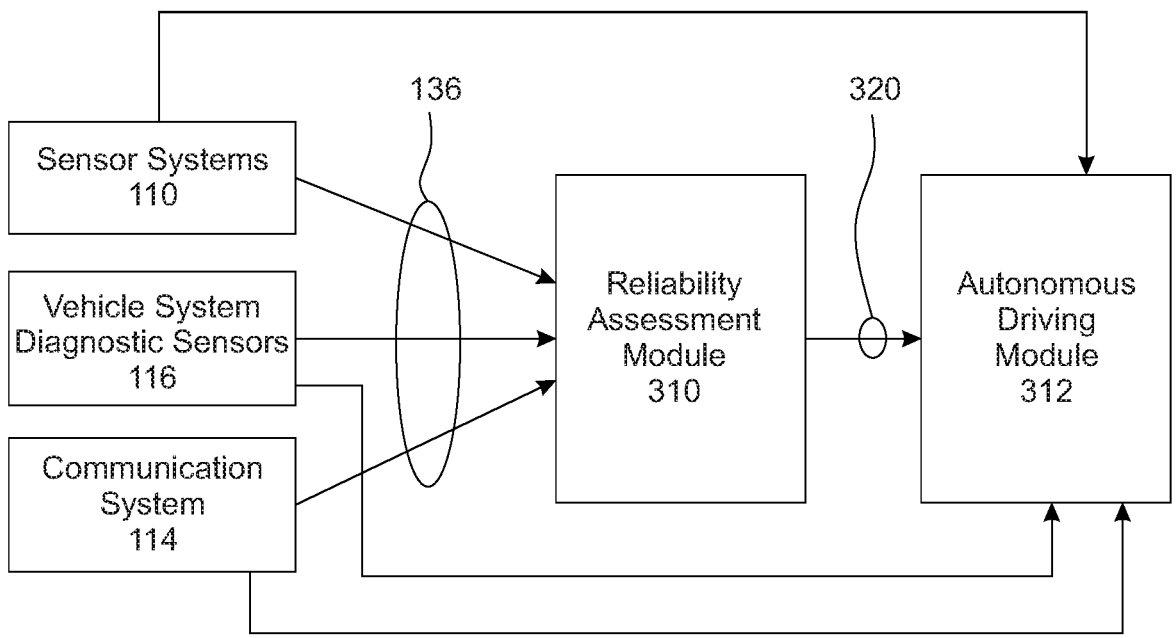
FIG. 3 is a block diagram showing data flow into an example reliability assessment module and an example autonomous driving module as part of an example reliability assessment system.

FIG. 3 is a block diagram showing how condition data 136 is used by the processor 106 to assess vehicle system reliability, and how this vehicle system reliability data 320 is then used to make decisions about operating the autonomous vehicle 100. The vehicle system reliability data 320 is generated by an assessment module 310 based on the received condition data 136. The assessment module 310 sends this vehicle system reliability data 320 to an autonomous driving module 312, which makes decisions about how to operate the vehicle 100. In some example embodiments, the assessment module 310 and/or the autonomous driving module 312 are functional software modules implemented by the processor 106 by executing computer instructions stored in the memory 104. In other example embodiments, one or both of these modules 310, 312 may be implemented by one or more separate processors housed inside or outside of the vehicle 100.

FIG. 3 also shows that the autonomous driving module may receive data from the communication system 114, sensors systems 110, and/or the vehicle system diagnostic sensors 116 in order to perform its autonomous driving functions.

The condition sensors 302, communications system 114, assessment module 310, and autonomous driving module 312 may communicate with each other through any suitable means, including wired or wireless digital communication. In examples where the assessment module 310 and autonomous driving module 312 are both implemented by the processor 106, they may communicate with each other through instructions or data stored in the memory 104.

Thus, in various examples the reliability assessment system 102 may encompass different recombinations of elements. In some examples, the reliability assessment system 102 encompasses simply a processor 106 and memory 104 which implement a reliability assessment module 310; any sensor systems 110, any diagnostic sensors 116, and/or the autonomous driving module 312 are all in communication with the reliability assessment system 102 but are not part of it. In other examples, the reliability assessment system 102 encompasses one or more of the sensor systems 110, diagnostic sensors 116, and/or the autonomous driving module 312.

The autonomous driving module 312 in example embodiments uses the vehicle system reliability data 320 to make decisions about how to operate the autonomous vehicle 100. These decisions may include the selection of an autonomous driving mode to govern the operation of the vehicle 100.

In some examples, the selected autonomous driving mode may indicate a level of autonomous operation of the vehicle 100, for example the six level of autonomy described above (from 0 to 5): where the vehicle system reliability data 320 indicates high confidence in the vehicle systems 108, level 5 autonomy may be selected or made available to a user as an option, but where the vehicle system reliability data 320 indicates lower confidence in the vehicle systems 108, a lower level of autonomous operation may be selected, or higher levels of autonomous operation may be made unavailable to a user.

In some examples, where the assessed vehicle system is a sensor system 110, the selected autonomous driving mode may indicate a weight to be given to the output of that sensor system 110 in making driving decisions. For example, where the reliability assessment module 310 receives condition data 136 indicating low reliability of the camera system 120 (due to, e.g., low light conditions, glare, or lens occlusion), the autonomous driving module 312 may decide to give low weight to the camera system 120 in making driving decisions due to the low confidence in the output of the camera system 120. Instead, its driving decision-making processes or algorithms will give higher weight to the output of other sensor systems 110 such as, e.g., its ultrasound system 126 and its GPS 128. In some examples, the weight given to a given sensor system 110 may be zero where low confidence has been assessed, meaning that the output of that sensor system 100 is not used in making driving decisions.

In some embodiments, the weight given to a sensor system 110 may instead or in addition include a threshold to be applied to the output of the sensor system 110. For example, where a low level of confidence is assessed for the output of a camera system 120, a different threshold may be applied by the autonomous driving module 312 for classifying a visible object as potentially dangerous based on its proximity, so as to err on the side of caution in low-visibility situations. As another example, when an environmental condition of rain is detected, the camera system 120 may set a different threshold for classification of dynamic objects with movement patterns consistent with rain, as rain tends to produce false positives for detection of dynamic objects by a camera when the threshold is set at a default level.

As a further example, a radar system 124 may in some applications be configured to filter out overhead structures (such as bridges or overpasses) from its sensor data— however, in the event that the reliability assessment module 310 assesses low confidence in other assessed sensor systems, the radar system 124 could have its threshold for this filtering set at a different level so as to effectively supply more radar information to the autonomous driving module 312 than it would in the default case. By setting the filtering threshold at a different level, the sensor data collected by the radar system 124 may be effectively given greater weight and/or a greater level of detail for use by the autonomous driving module 312.

In some examples, the selected autonomous driving mode may involve activation or deactivation of one or more auxiliary vehicle systems. A LIDAR system 122 tends to be precise, but in case of rainy weather conditions it may fail. An example vehicle 100 may thus have a stereo camera system 121 kept in reserve as an auxiliary vehicle system, but a LIDAR system 122 that is used as the primary navigation sensor. If the assessment module 310 assesses a low level of confidence in the reliability of the LIDAR system 122 (due to, e.g., rainy environmental conditions), the stereo camera system 121 may be activated to assist, augment, and/or replace the LIDAR system 122 in navigation (e.g. by using the stereo camera system 121 to assess the depth estimation). Conversely, if the assessment module 310 later assesses a high level of confidence in the camera system 120, the LIDAR system 122 may be deactivated. The auxiliary system in some examples may be a non-sensor system 112, such as a four-wheel-drive system or an anti-lock braking system.

As a further example, a vehicle 100 may have multiple redundant inexpensive sensors such as camera systems 120. When low confidence is assessed for a primary camera system 120 due to conditions such as a frozen or dusty lens, a redundant camera system 120 may be activated.

The autonomous driving module 312 may respond to reliability data 320 in other specific ways depending on the specific contents of the data 320. For example, data that indicates rain in the environment might trigger the autonomous driving module 312 to apply a pre-filter to incoming image data 210 from the camera system 120. The data indicating rain could come directly from one or more sensor systems 110 or from reliability data 320 generated by the reliability assessment module 310. In some examples, other pre-processing steps could be applied to other types of sensor data as well to remove or minimize the effects of detected adverse conditions.

Each of these actions undertaken by the autonomous driving module 312 can be taken alone or in combination with other. For example, when rain is detected, the autonomous driving module 312 may deactivate a LIDAR system or give its output lower weight, while also selecting a lower level of autonomy for the vehicle because of the lower confidence in the overall ability of the vehicle's sensor systems 110 to navigate the environment under those conditions.

Figure 4:
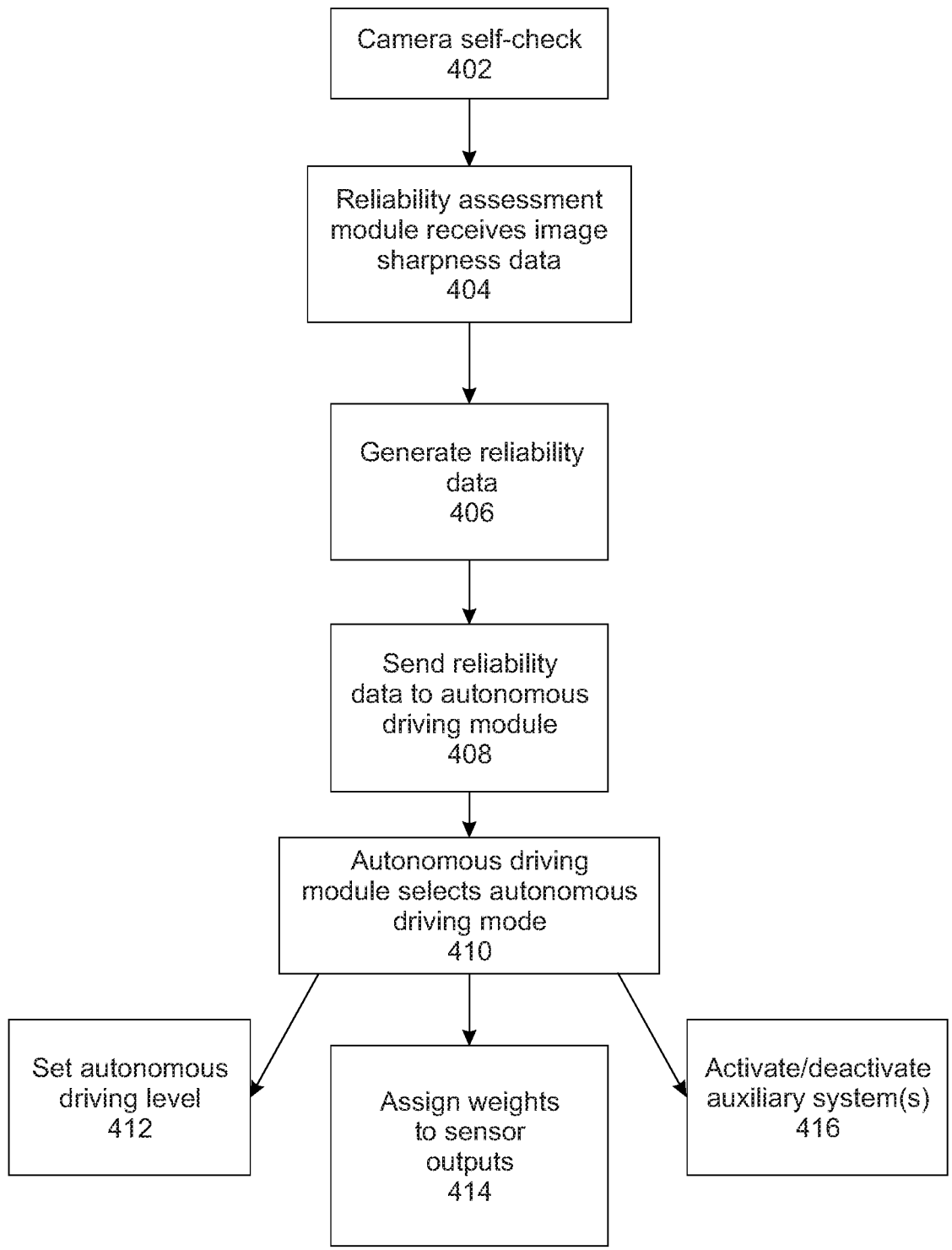
FIG. 4 is a flowchart showing an example method for assessing the reliability of vehicle systems.

FIG. 4 shows a flowchart for the operation of an example reliability assessment system 102 as part of an example autonomous vehicle 100. Th process begins with a camera system 120 performing a self-check 402, such as a sweep of its focal length as described above. The image data 210 generated by the self-check 402, which may include image sharpness data, is received by the reliability assessment module 310 at step 404. Based at least in part on the image data 210, the reliability assessment module 310 at step 406 generates reliability assessment data 320 pertaining to the camera system 120 and/or other vehicle systems 108. At step 408, the reliability assessment module 310 sends the reliability assessment data 320 to the autonomous driving module 312. At step 410, the autonomous driving module uses the vehicle system reliability data 320 to select an autonomous driving mode. This selection may involve one or more of the steps of: setting a level of autonomy for the vehicle at step 412; assigning weights to the outputs of various sensor systems 110 at step 414; and/or activating or deactivating one or more auxiliary vehicle systems at step 416.

In some examples, the functional division between the reliability assessment module 310 and the autonomous driving module 312 is that the reliability assessment module 310 serves to determine what set of vehicle sensor systems 110 is able to operate robustly under the current set of conditions. The autonomous driving module 312 then takes action based on this determination.

The above examples describe the use of the vehicle system reliability data 320 to make vehicle operation decisions in the autonomous driving module 312. However, some example embodiments may also use the vehicle system reliability data 320 as training data to improve the operation of the autonomous driving functions of the vehicle 100 or of other vehicles. For example, the vehicle system reliability data 320 may be used, alone or in combination with condition data 136 and/or driving data from the vehicle 100, to improve future reliability assessments carried out by the assessment module 310 and/or to improve future driving decisions made by the autonomous driving module 312. This data may also be shared with remote systems, such as an Internet server or another autonomous vehicle, by transmitting it over the communication system 114 for use in training autonomous driving systems.

This use of the reliability data 320 for training purposes addresses a further difficulty with existing autonomous driving solutions. Different autonomous driving solutions may be more effective under different conditions, and researchers may try to feed more data to their algorithms to figure out the effect of these conditions as part of their training procedures. However, having that amount of labeled data can be challenging. In addition, optimizing such a system will take a lot of time, and a great deal of uncertainty is involved in the design and training of such systems. By collecting the reliability data 320, alone or in combination with condition data 136 and/or driving data from the vehicle 100, for use in training, these problems may be alleviated.

In some examples, the vehicle 100 may initially be deployed with a low level of autonomy (e.g. level 0-2) and only enable higher levels of autonomy (e.g. 3-5) once it has collected sufficient reliability data 320 and driving data to confidently operate at those higher levels of autonomy in a range of conditions.

In some examples, the vehicle may include further systems and features for acting on the reliability data 320. An example vehicle 100 may include user interface features, such as a dashboard system having one or more speakers, displays, communications subsystems for interfacing with a user's electronic devices, etc. As part of selecting an autonomous driving mode, a user may be presented with options based on the reliability data 320, such as a subset of choices for the desired level of autonomy, activation or deactivation of auxiliary systems, warnings about hazardous conditions, and so on.

In some examples, the reliability assessment system 102 may incorporate features of the Functional Safety Standard (ISO 26262) for detecting system reliability, which is hereby incorporated by reference. This standard sets different levels of Tool Error Detection for specific automotive systems. However, the standard primarily relates to offline reliability tests which result in a pass/fail assessment. The present disclosure includes examples of real-time, ongoing self-tests; examples of tests resulting in richer information than binary pass/fail; and examples of tests that would not be detected as a "fail" state by the standard but could still provide useful, actionable information about a vehicle system to an autonomous driving solution. In that sense the standard provides a low-level baseline for evaluating the reliability of vehicle systems that is improved upon in the described examples.

The various types of data described may in some examples be combined with, or used in conjunction with, other data types. For example, the reliability assessment module 310 and/or the autonomous driving module 312 may make use of data received from remote sources over the communication system 114, data received from the user through a user interface feature, historical data stored in memory 104, or other types and sources of data in addition to the data collected from sensor systems 110, the data collected from diagnostic sensors 116, and the reliability data 320 generated by the reliability assessment module 310. These other data sources could in some examples provide condition data 136 and/or other data types, such as information about a user's physical or mental state; historical driving data from the vehicle 100; driving data and/or condition data from other vehicles; equipment specification data regarding the vehicle systems 108; and any other appropriate types of data as would be appreciated by a person of ordinary skill.

In an example embodiment, at least some or all aspects of the processor 106 are performed by at least two processors. For example, as described above, some of the logic may be distributed to a first processor 106 implementing the reliability assessment module 310 and a second processor implementing the autonomous driving module 312. Some of the processing may be distributed so that the processor 106 is primarily responsible for higher level monitoring, control, and command, while other controllers or processors have specific task functions. This allows, for example, the individual sensor systems 110 to perform their own calculations at a faster rate or to perform their own local control or loop functions. The processor 106 would still be able to perform higher level functions and commands by continuously performing the described example method(s).

Figure 5:
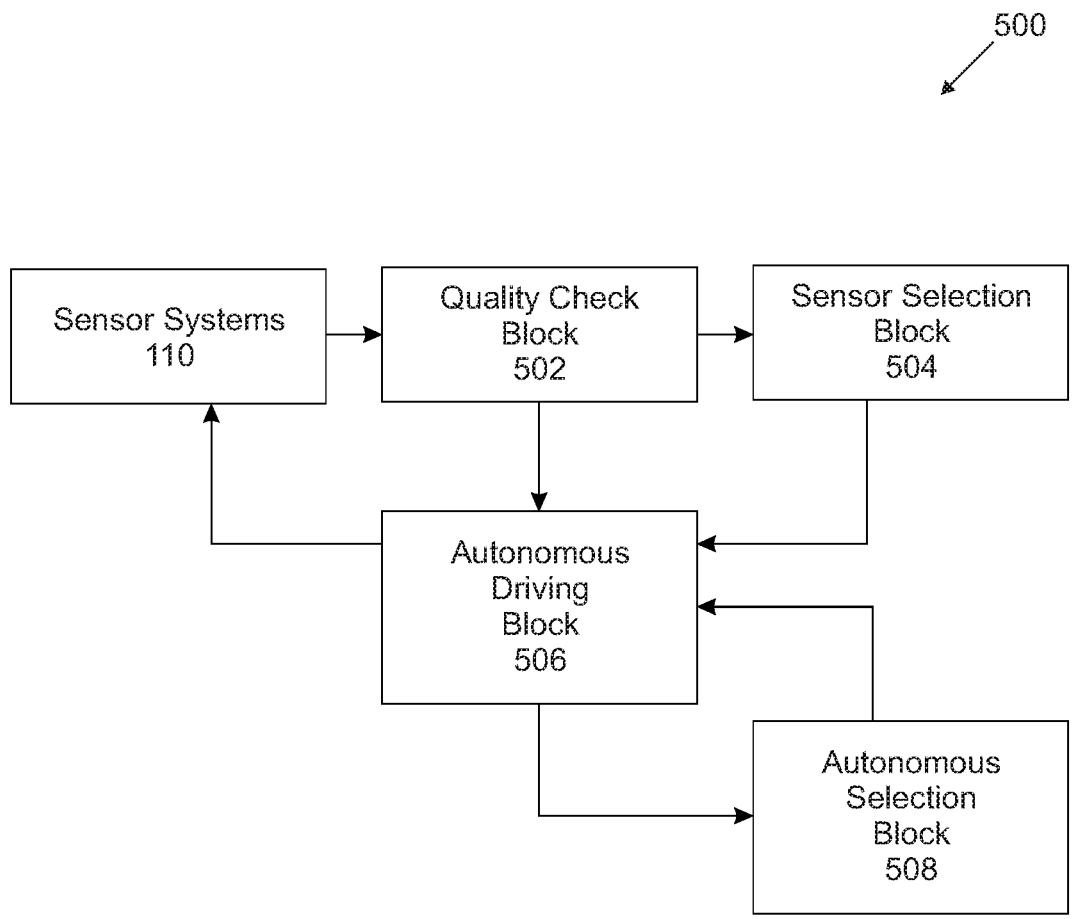
FIG. 5 is a block diagram showing data flow between functional blocks in an example embodiment of a system having four functional blocks: a quality check block, a sensor selection block, an autonomous driving block and an autonomy selection block.

Similarly, although the systems and methods have been described in some examples as being divided into a reliability assessment module 310 and an autonomous driving module 312, the methods and systems described may be split into a different number of functional sub-units or modules. FIG. 5 shows an example four-block system 500 that makes use of a quality check block 502 that checks for faults in the data received from sensor system 100; a sensor selection block 504 that selects a set of sensor systems 100 to use based on the output of the quality check block; an autonomous driving block 506 that uses the output of the first two blocks 502,504 along with the output of the selected sensor systems 110 to operate the vehicle 100 and to generate a confidence level in the ability of the vehicle 100 to operate autonomously under the present conditions; and an autonomy selection block 508 that constrains the level of autonomy allowed to the vehicle 100 based on the confidence determination of the third block 506. In other examples, the second block 504 and/or fourth block 508 could be included as part of the third block 506.

Although the present disclosure may be described, at least in part, in terms of methods and systems, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer- or processor-readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods or systems disclosed herein.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A system for assessing reliability of a sensor system of an autonomous vehicle, the sensor system comprising a camera, the system comprising:
   a condition sensor for obtaining condition data, the condition data including at least one of:
      environmental condition data indicative of environmental conditions of the environment in which the autonomous vehicle is operating; and
      vehicle system condition data relating to the sensor system;
   a device comprising:
      a processor;
      a memory storing computer-readable instructions of a reliability assessment module for assessing the reliability of the sensor system of the autonomous vehicle, wherein when the computer-readable instructions are executed by the processor, the processor causes the device to:
      receive the condition data from the condition sensor;
      generate vehicle system reliability data indicative of an assessed reliability of the sensor system based on a predetermined relationship between the condition data and a reliability level of the sensor system,
   wherein the vehicle system reliability data is represented multi-dimensionally to distinguish degrees of the assessed reliability;

sending the vehicle system reliability data to an autonomous driving module for selection of an autonomous driving mode for the autonomous vehicle based on the vehicle system reliability data, wherein the autonomous driving mode indicates a weight to be applied to data received from the sensor system.

2. The system of claim 1, wherein the sensor system comprises the condition sensor.

3. The system of claim 1, wherein the condition sensor is a vehicle system diagnostic sensor configured to diagnose a status of the sensor system and generate the condition data, and the condition data includes vehicle system condition data relating to the sensor system.

4. The system of claim 1, wherein the condition sensor is an environmental sensor, the condition data includes environmental condition data indicative of environmental conditions of the environment in which the autonomous vehicle is operating, and the vehicle system reliability data indicative of an assessed reliability of the sensor system is generated based on a predetermined relationship between the environmental condition data and a reliability level of the sensor system.

5. The reliability assessment system of claim 1, wherein the sensor system further comprises one or more additional sensors selected from the group consisting of: a light detection and ranging (LIDAR) sensor, a radar sensor, an ultrasound sensor, and a GPS sensor.

6. The system of claim 3, wherein the vehicle system condition data includes image data indicative of a sharpness of an image captured by the camera, and the vehicle system reliability data is indicative of an assessed reliability of the camera.

7. The system of claim 4, wherein the environmental condition data comprises weather-related environmental condition data.

8. The system of claim 1, further comprising:
an additional condition sensor, the additional condition sensor configured to obtain additional vehicle system condition data relating to the sensor system; and
the vehicle system reliability data is further generated based on the additional vehicle system condition data received from the additional condition sensors.

9. The system of claim 1, wherein the memory stores further computer-readable instructions of the autonomous driving module which, when executed by the processor, causes the device to select the autonomous driving mode for the autonomous vehicle based on the vehicle system reliability data.

10. The system of claim 9, wherein the autonomous driving mode further indicates one of a plurality of levels of autonomy for the autonomous vehicle.

11. The system of claim 9, wherein when the computer-readable instructions of the autonomous driving module are executed by the processor, the processor causes the device to activate or deactivate one or more auxiliary vehicle systems of the autonomous vehicle based on the selected autonomous driving mode.

12. The system of claim 9, wherein the condition data includes vehicle system condition data relating to the sensor system, and wherein the vehicle system condition data indicates a failure state of the sensor system.

13. The system of claim 12, wherein the weight is zero.

14. The system of claim 1, wherein the vehicle system reliability data is associated with a confidence level of the sensor system.

15. A method for assessing reliability of a sensor system of an autonomous vehicle, the sensor system comprising a camera, the system comprising:
receiving, at a reliability assessment module of the autonomous vehicle, condition data from a condition sensor of the autonomous vehicle, the condition data including at least one of:
environmental condition data indicative of environmental conditions of the environment in which the autonomous vehicle is operating; and
vehicle system condition data relating to the sensor system;
generating, by the reliability assessment module, vehicle system reliability data indicative of an assessed reliability of a sensor system based on a predetermined relationship between the condition data and a reliability level of the sensor system, wherein the vehicle system reliability data is represented multi-dimensionally to distinguish degrees of the assessed reliability;
sending the vehicle system reliability data to an autonomous driving module of the autonomous vehicle for selection of an autonomous driving mode for the autonomous vehicle based on the vehicle system reliability data, wherein the autonomous driving mode indicates a weight to be applied to data received from the sensor system.

16. The method of claim 15, wherein the sensor system comprises the condition sensor.

17. The method of claim 15, wherein the condition sensor is a vehicle system diagnostic sensor configured to diagnose a status of the sensor system and generate the condition data, and the condition data includes vehicle system condition data relating to the sensor system.

18. The method of claim 15, wherein the condition sensor is an environmental sensor, the condition data includes environmental condition data indicative of environmental conditions of the environment in which the autonomous vehicle is operating, and the vehicle system reliability data indicative of an assessed reliability of the sensor system is generated based on a predetermined relationship between the environmental condition data and a reliability level of the sensor system.

19. The method of claim 15, wherein the sensor system further comprises one or more additional sensors selected from the group consisting of: a light detection and ranging (LIDAR) sensor, a radar sensor, an ultrasound sensor, and a GPS sensor.

20. The method of claim 17, wherein the vehicle system condition data comprises includes image data indicative of a sharpness of an image captured by the camera, and the vehicle system reliability data is indicative of an assessed reliability of the camera.

21. The method of claim 18, wherein the environmental condition data comprises weather-related environmental condition data.

22. The method of claim 15, further comprising:
receiving additional vehicle system condition data relating to the sensor system from an additional condition sensor; and
the vehicle system reliability data is further generated based on the additional vehicle system condition data received from the additional condition sensors.

23. The method of claim 15, further comprising selecting, at the autonomous driving module, the autonomous driving mode for the autonomous vehicle based on the vehicle system reliability data.

24. The method of claim 23, wherein the autonomous driving mode further indicates one of a plurality of levels of autonomy for the autonomous vehicle.

25. The method of claim 23, further comprising activating or deactivating one or more auxiliary vehicle systems of the autonomous vehicle based on the selected autonomous driving mode.

26. The method of claim 23, wherein the condition data includes vehicle system condition data relating to the sensor system, and wherein the vehicle system condition data indicates a failure state of the sensor system.

27. The method of claim 25, wherein the weight is zero.

28. The method of claim 15, wherein the vehicle system reliability data is associated with a confidence level of the sensor system.

29. A non-transitory processor-readable medium storing instructions of a reliability assessment module for assessing reliability of a sensor system of an autonomous vehicle, the sensor system comprising a camera, the instructions executable by a processor of a device to:

receive condition data from a condition sensor, the condition data including at least one of:

environmental condition data indicative of environmental conditions of the environment in which the autonomous vehicle is operating; and vehicle system condition data relating to the sensor system;

generate vehicle system reliability data indicative of an assessed reliability of a sensor system based on a predetermined relationship between the condition data and a reliability level of the sensor system, wherein the vehicle system reliability data is represented multi-dimensionally to distinguish degrees of the assessed reliability;

send the vehicle system reliability data to an autonomous driving module of the autonomous vehicle for selection of an autonomous driving mode for the autonomous vehicle based on the vehicle system reliability data, wherein the autonomous driving mode indicates a weight to be applied to data received from the sensor system.

* * * * *

UNITED STATES PATENT AND TRADEMARK OFFICE
CERTIFICATE OF CORRECTION

| | | |
|---|---|---|
| PATENT NO. | : 10,831,190 B2 | Page 1 of 1 |
| APPLICATION NO. | : 15/683192 | |
| DATED | : November 10, 2020 | |
| INVENTOR(S) | : Elmira Amirloo Abolfathi | |

It is certified that error appears in the above-identified patent and that said Letters Patent is hereby corrected as shown below:

In the Claims

In Column 14, Line 50 (Claim 20): "condition data comprises includes image data indicative of" should read -- condition data includes image data indicative of --.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*